US006912688B1

(12) United States Patent
Zhou et al.

(10) Patent No.: US 6,912,688 B1
(45) Date of Patent: *Jun. 28, 2005

(54) SCRIPT EDITOR

(75) Inventors: Yiming Zhou, Basingstoke (GB); Mark John McGrath, Bracknell (GB)

(73) Assignees: Sony Corporation, Tokyo (JP); Sony United Kingdom Limited, Weybridge (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 769 days.

(21) Appl. No.: 08/821,320

(22) Filed: Mar. 20, 1997

(30) Foreign Application Priority Data

Mar. 27, 1996 (GB) .............................................. 9606444

(51) Int. Cl.[7] ................................................ G06F 7/00
(52) U.S. Cl. ............................... 715/500.1; 715/501.1; 715/716
(58) Field of Search ................................ 345/302, 328; 707/515; 715/500.1, 501.1, 716

(56) References Cited

U.S. PATENT DOCUMENTS

| 4,858,033 A | * | 8/1989 | Chippendale ................. 386/57 |
| 5,274,758 A | | 12/1993 | Beitel et al. ................. 345/302 |
| 5,404,316 A | * | 4/1995 | Klingler et al. .............. 364/514 |
| 5,481,296 A | * | 1/1996 | Cragun et al. ............... 348/461 |
| 5,649,060 A | * | 7/1997 | Ellozy et al. ............. 369/25.01 |
| 5,664,087 A | | 9/1997 | Tani et al. ................... 345/473 |
| 5,781,687 A | * | 7/1998 | Parks .......................... 386/52 |
| 5,782,692 A | * | 7/1998 | Stelovsky ...................... 463/1 |
| 5,915,256 A | * | 6/1999 | Rogers et al. ............... 707/501 |
| 6,271,892 B1 | * | 8/2001 | Gibbon et al. .............. 348/589 |

FOREIGN PATENT DOCUMENTS

| EP | 0 338 753 | 10/1989 |
| EP | 0 598 597 | 5/1994 |
| JP | 04 258 090 | 9/1992 |

OTHER PUBLICATIONS

Infrared decoding and vertical sync extraction techniques for automatic home video editing, Wong, E, M, IEEE, p. 903–911.*
S. VIgneaux, "The Integration of a Newsroom Computer System with a Server–centred News Production System", International Broadcasting Convention, Sep. 12–16, 1996, pp. 512–518, XP002113460.

* cited by examiner

*Primary Examiner*—C. B Paula
(74) *Attorney, Agent, or Firm*—Frommer Lawrence & Haug LLP; William S. Frommer

(57) ABSTRACT

An editing system has a video store for storing a video sequence and a text store for storing a sequence of text associated with the video sequence. Displays and are provided for displaying the video and the text on the text display. The current text position is indicated by a cursor 10 or by another marker. The frames of the video sequence have time codes associated therewith. Corresponding time codes are associated with the text using the time codes and the rate n of reading words:—

The current position in the text is controllable in dependence on the time code of the video frames; and the video frame currently displayed is controllable in dependence upon the current position in the text.

8 Claims, 4 Drawing Sheets

SCRIPT EDITOR

BACKGROUND OF THE INVENTION

1. Field of the Invention

The present invention relates to editing scripts associated with video sequences and to an editing system having provision for editing such scripts

2. Description of the Prior Art

It is known to produce a sequence of video clips by editing source material. The sequence may for example comprise several clips assembled in an order which illustrates a news story. The news story is set out in a script which accompanies the sequence.

The sequence is required to be of a desired duration and the script is required to match the sequence, scenes within the video sequence being matched with sections of the script.

Once a draft sequence has been assembled and a draft script has been written or is being written it is desirable to check it matches the video sequence as intended by the scriptwriter.

SUMMARY OF THE INVENTION

In accordance with the invention, there is provided an editing system comprising:

means for simultaneously displaying a sequence of video frames and for displaying a sequence of text associated with the said sequence of video frames;

a video store for storing a sequence of frames and associated time codes to be displayed;

a text store for storing the said associated sequence of text and time codes;

means for indicating on the display a current text position; and means for selectively a) controlling the display of the video frames in dependence upon the time code of the current position and b) controlling the current text position in dependence upon the time code of video frame currently being displayed.

BRIEF DESCRIPTION OF THE DRAWINGS

The above and other objects, features and advantages of the invention will be apparent from the following detailed description of illustrative embodiments which is to be read in connection with the accompanying drawings, in which.

Figure 2:
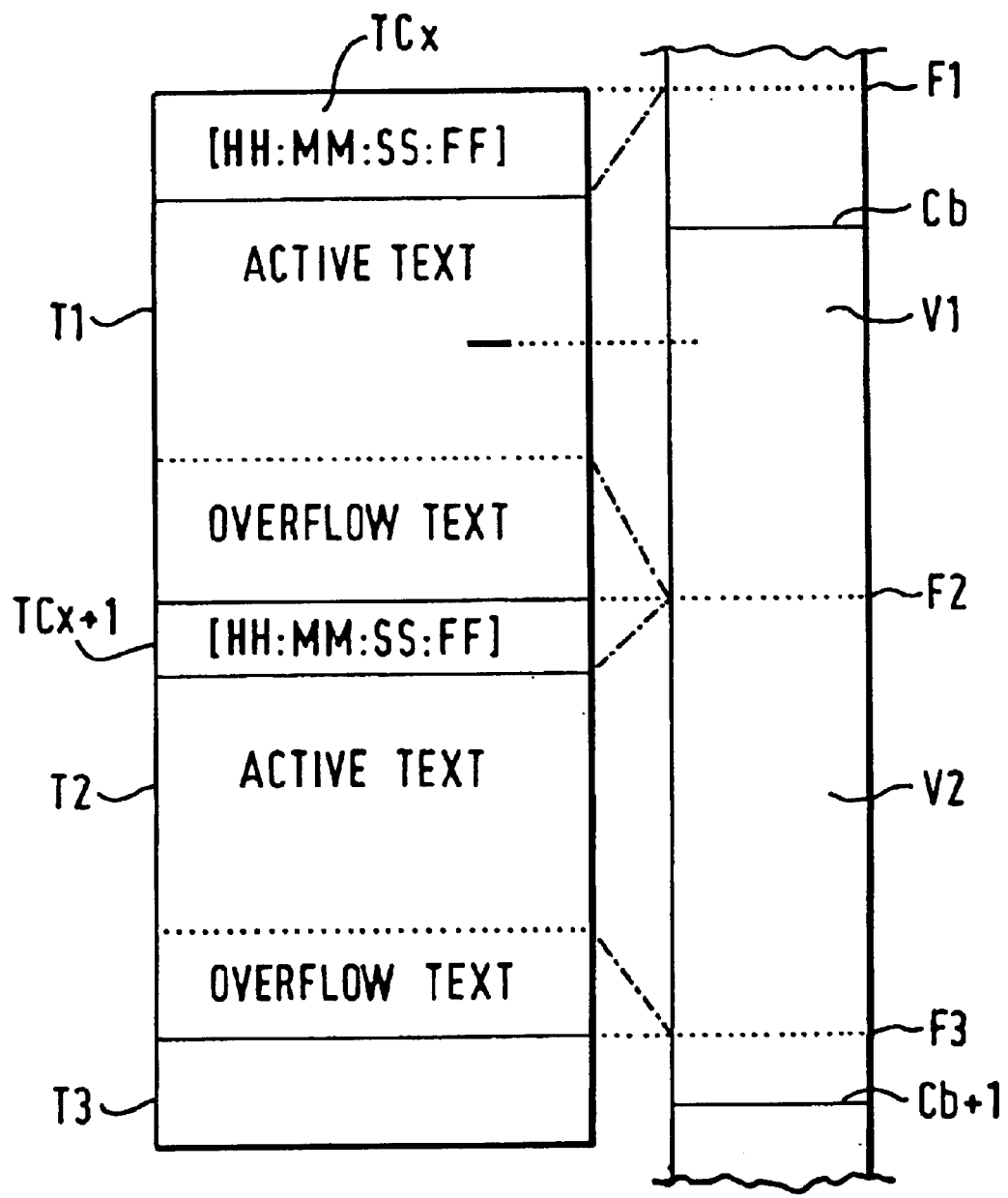
Figure 3:
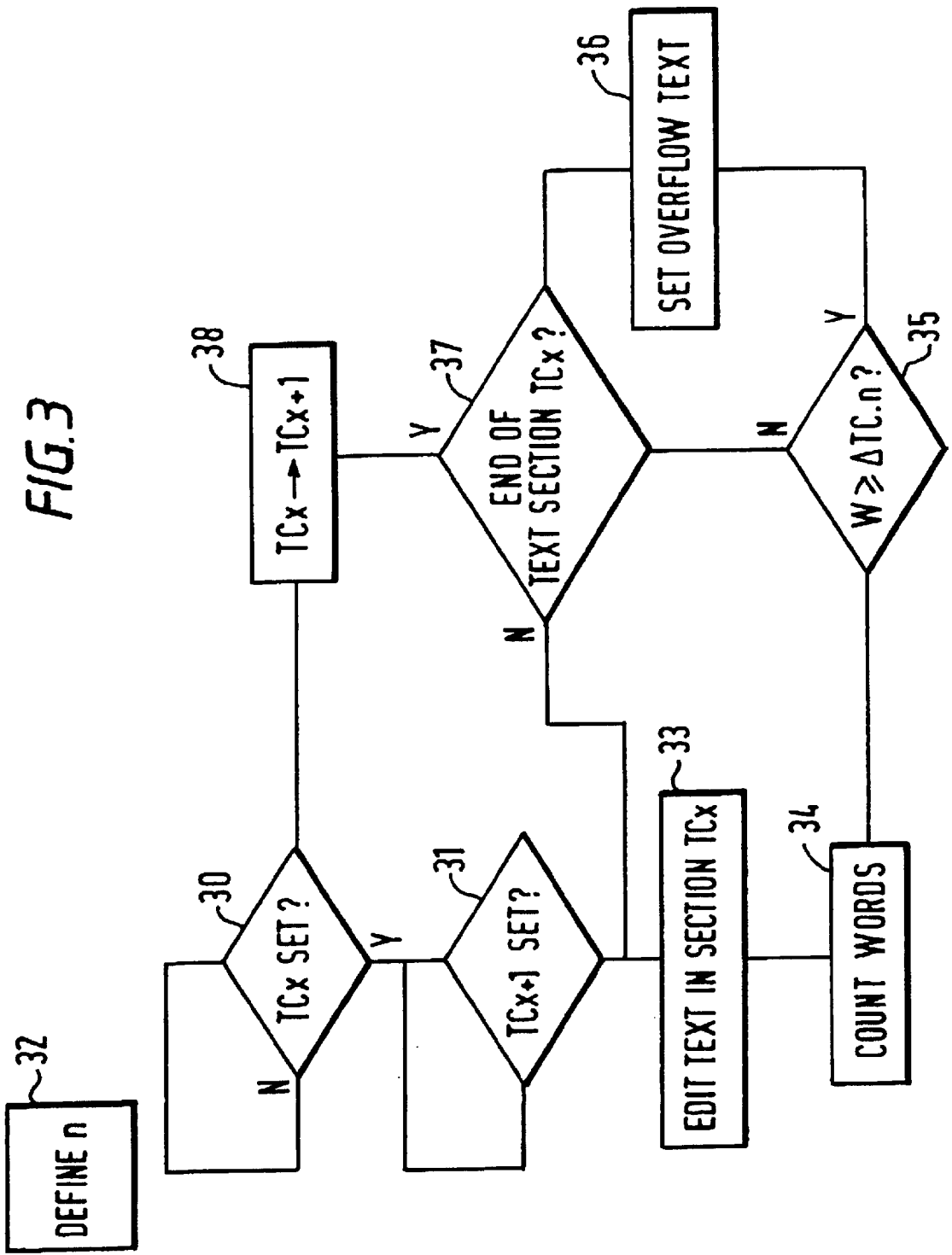
Figure 4:
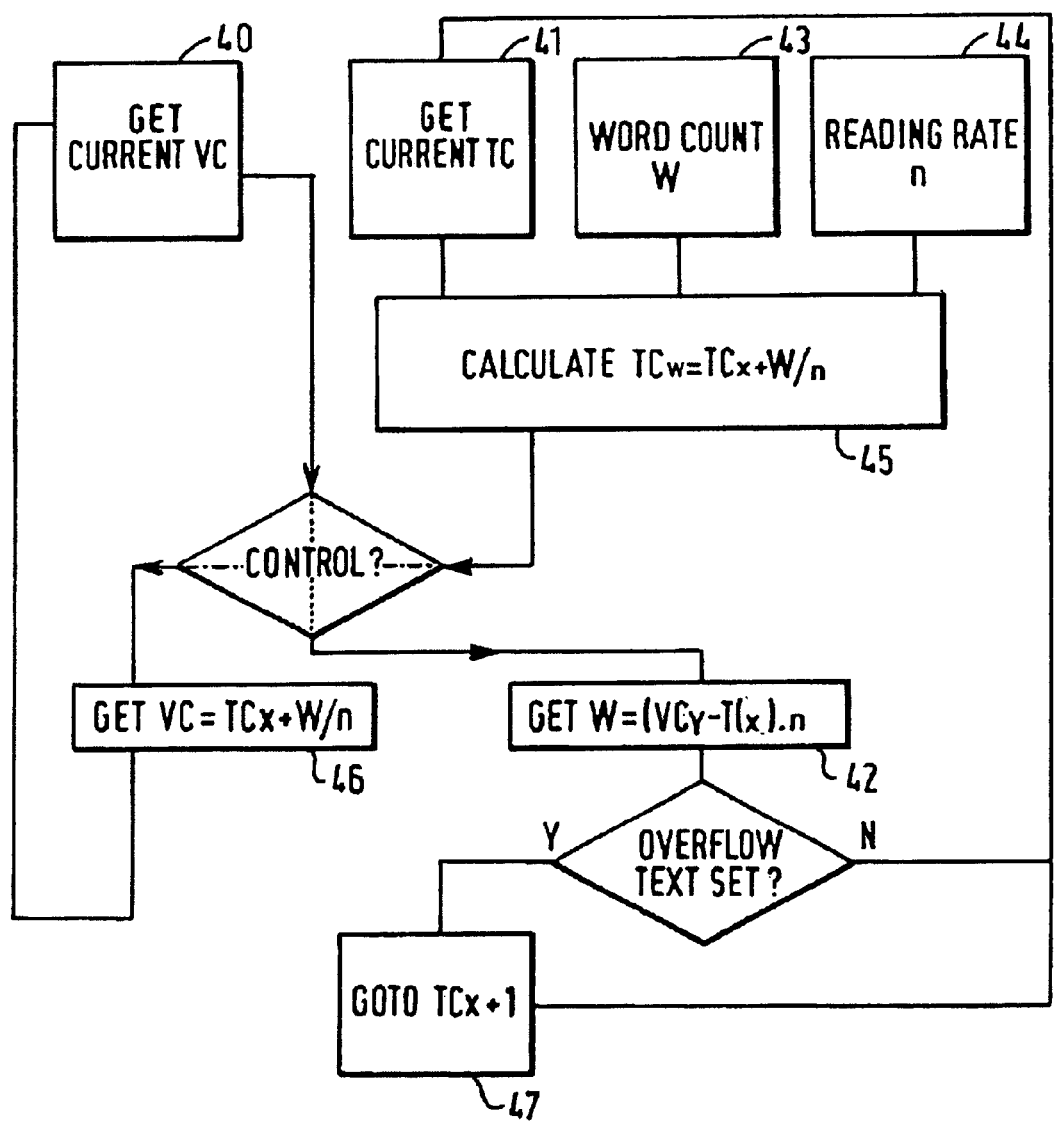

system in accordance with the invention;

FIG. 2 is a schematic diagram illustrating correspondence between sections of video sequence and sections of text;

FIG. 3 is a flow diagram illustrating the manner in which text associated with a section of video is allocated to active and overflow text areas in accordance with one aspect of the invention; and FIG. 4 is a flow diagram illustrating the manner in which the text and the video sequence are locked to each other in accordance with another aspect of the invention.

DESCRIPTION OF THE PREFERRED EMBODIMENTS

An Editor or Script Writer selects video clips to be assembled into a video sequence. In the assembled sequence the frames or groups of 2 or more frames of the assembled sequence are identified by a sequence of time codes having the form

HH:MM:SS:FF where HH is a two digital number representing hours;
MM is a two digit number representing minutes;
SS is a two digit number representing seconds; and
FF is a two digit number representing frames, or equivalently 30ths or 25ths of a second depending on whether the video frame is derived from a video signal having 525 lines at a frame rate of 30 frames per second or 625 lines at a frame rate of 25 frames per second.

Figure 1:
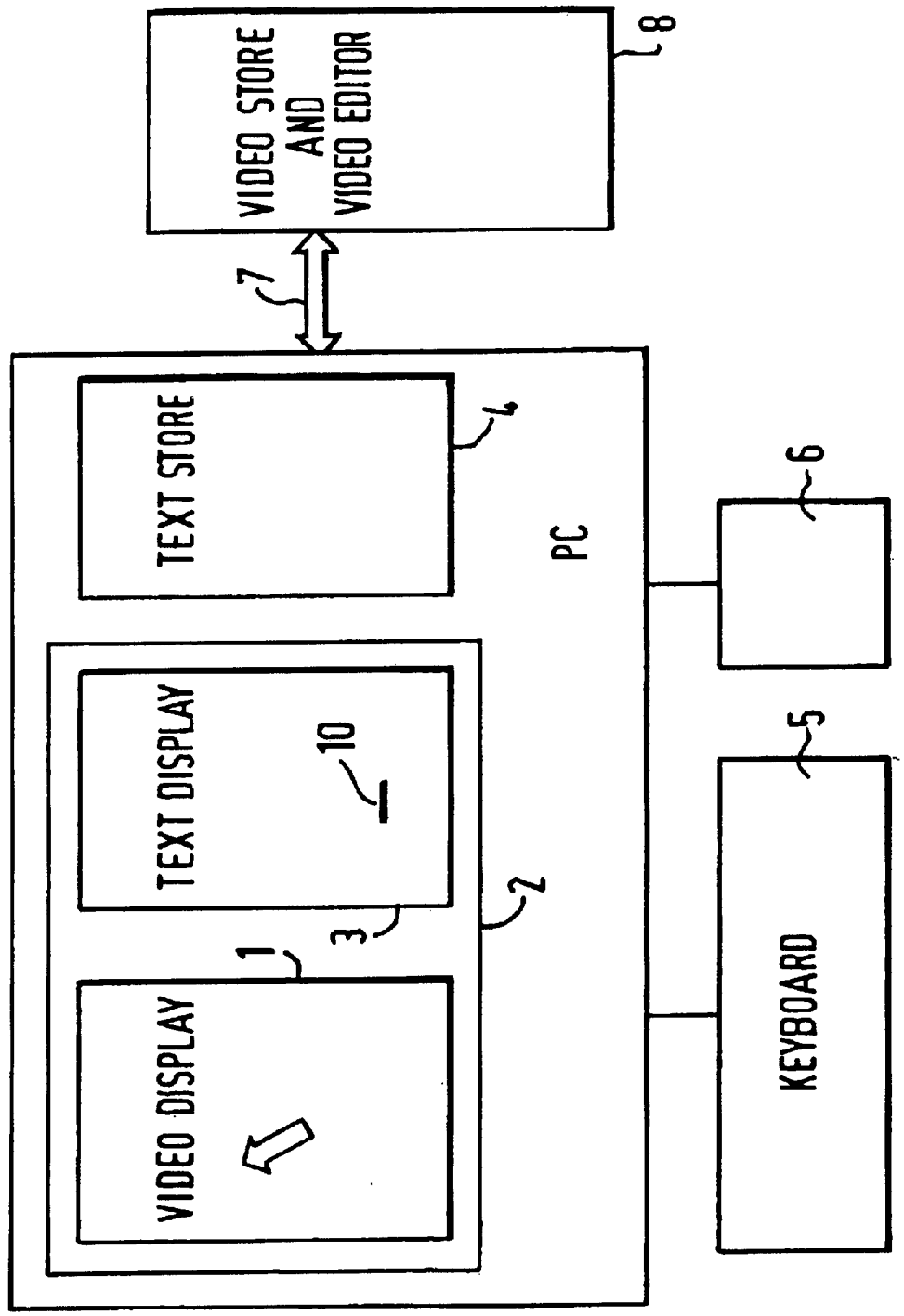
FIG. 1 is a schematic diagram of an illustrative display device of an editing system in accordance with the invention.

Once the video sequence has been assembled it is viewed in a video display section 1 of a display device 2, as shown in FIG. 1. A text display section 3 is also provided. The text display section 3 displays the text of the script which is associated with the video sequence simultaneously with the display of the video sequence in section 1. The script typically has sections which match corresponding sections of the video sequence.

Referring to FIG. 2, the script writer views the assembled video sequence and decides how sections of a proposed script (T1, T2 etc) correspond to sections (V1, V2, V3 etc) of the video sequence. The Script Writer chooses frames (F1, F2 and F3) which correspond with the starts of the sections (T1, T2 etc) of the proposed script. The frames chosen to correspond to the beginnings and ends of sections of the text may, or may not correspond to beginnings Cb, Cb+1 of individual clips making up the video sequence.

The time code TCx of the video frame corresponding to the beginning of a section of text is entered into that section of the text in the form [HH:MM:SS:FF].

Successive time codes TCx, TCx+1 are entered into the text to indicate the beginnings of respective sections (T1, T2) of the text which are associated with respective sections (V1, V2) of the video sequence.

The number W of words of text which can be fitted into a section of text is a function of the duration of the section as defined by successive time codes (TCx, TCx+1) and the rate n at which the words are to be read $$W=(TCx+1-TCx).n$$

The amount of text which the script writer actually enters may exceed W. Furthermore, the writer may wish to vary the rate n of reading the words.

For that purpose, in accordance with one aspect of the present invention, there is displayed for each section (T1, T2) of text:

an active text sub-section; and
an overflow or inactive text sub-section.

For the purposes of illustration, the sub-sections are separated from the active sections in FIG. 2 by a marker in the form of a dotted line, but many other ways of denoting the sub-sections could be used. For instance active text could be distinguished from overflow text by: background colour; foreground colour; highlighting, font; or by a combination of these.

The number W of words in the active text sub-section is defined by the time codes TCx and TCx+1 at the beginning of the current text section and the next text section respectively and the rate n of reading words.

Any words in excess of W are automatically entered into the overflow text sub-section.

If the number of words in the active sub-section and/or the read rate n is changed, words automatically transfer from the active sub-section to the overflow sub-section or vice versa.

It is desirable to check that the video sequence matches the text either once the text has been written or during writing of the text. Thus, in accordance with another aspect of the present invention:— a) the video sequence may be replayed and the text displayed under control of the time codes derived from the video sequence; and b) the video sequence may be replayed under the control of the text the frame being displayed being defined by the current position in the text; as selected by the Editor.

The current position in the text is indicated by an indicator such as a cursor or highlighting. When the video sequence controls display of the text, the text position indicator moves through the text synchronously with the video sequence. When the text controls the video sequence, movement of the indicator through the text causes the video sequence to be displayed synchronously with the movement of the text indicator.

The rate of movement through the text relative to the rate of movement through the video sequence is defined by the rate n of reading the text.

If the text section is divided into active and overflow sub-sections, the overflow sub-section is disregarded, the video sequence being controlled only by the active text and the video sequence controls only position in the active text.

Referring again to FIG. 1, the editing system comprises a computer PC which may be a laptop computer. The computer has an LCD display 2 arranged to display the video sequence in the window 1 and the text in another window 3. The computer has conventional data storage 4 for storing text, a keyboard 5 for entering text and a pointing device 6.

A conventional text editor is provided in the PC for editing the text.

The computer PC is linked by an interface 7 to a video editor 8 which includes data storage for edited video sequences. The video editor operates in known manner to produce the video sequences in which the frames or groups of 2 or more frames are allocated the time codes.

Referring to FIG. 3, in order to produce a section of text corresponding to a section of video, the time codes TCx of the beginning of the section and TCx+1 of the beginning of the next section must be set in the text as indicated at steps 30 and 31.

The time codes may be entered manually using the keyboard and the text editor. Once the first time code is entered, the next code is entered with a space, eg. one line between them. The time codes are entered in the form.

HH:MM:SS:FF

Dialogue boxes may be provided to enter the time codes.

Alternatively the time codes are displayed with the video sequence. The video sequence is run until it reaches the frame corresponding to the start of a text section. The associated time code is then copied on to the text section, or the time codes are set to be displayed in the text section and the appropriate ones selected. As another alternative, the text and its time codes can be written and stored in a separate file and then imported in to the text editor for the video sequence.

The rate of n of reading words is set at step 32.

Text is entered into the text section beginning at TCx using the text editor and keyboard and if necessary the pointing device. The text editor counts the number W of words entered beginning at TCx.

At step 35 the number of words W of the text is compared with the number of words ΔTC.n which can be fitted into the text section where ΔTC=TCx+1−TCx and n is the rate of reading words.

If W≧ΔTC.n then words in excess of ΔTC.n are allocated to an inactive text sub-section, as indicated at step 36.

Words are entered until the script writer indicates the end of the section of text TCx. In this example this is done by moving the cursor to the start of the next section TCx+1 of the text.

Then, at step 38, TCx+1 becomes the beginning (denoted TCx) of the new section and the new time code TCX+1 of the new section is entered at step 31.

The time codes of the sections may be changed at any time and new time codes entered into the text at any point. The position of the overflow text is recalculated for each change.

The reading rate n may be changed and consequently the position of the overflow text recalculated.

Referring to FIG. 1 again, once a video sequence has been edited and stored, and the corresponding text sequence has been edited and stored, the video store stores the video sequence with its associated time codes and the text store stores the text sequence with the its associated time codes. In the presently preferred embodiment of the invention the video time codes are identical to the text time codes. The text sequences and the video sequences are stored in files in directories in conventional manner. The computer PC via the interface 7 can access any video sequence by its directory and file names and can access any video frame in a sequence by its time code TCx. Any word number W/n corresponding to a particular time code TCw within the section is accessed by calculating $$W=(TCw-TCx).n$$

and the time code TCw of any word W is calculated as $$TCw=TCx+W/n$$

This allows the current position in the text indicated by for example a conventional cursor 10 to be controlled in dependence upon the video frames. This also allows control of the display of the video frame in dependence upon the current text position.

Reference will now be made to FIG. 4. Assume the video sequence and its corresponding text sequence have been accessed by the computer. Assume the video frames control the text display. The computer accesses each successive frame by its time code VCy (40) by generating the time codes VCy one by one to call up the frames. The computer accesses (41) the text section having the nearest time code TCx less than the time code VCy of the video frame. Alternatively, the computer may derive the time codes VCy from the video sequence and access the text from the derived time codes VCy, selecting the text section having the nearest time code TCx less than VCy. The computer calculates the word position W=(VCy−TCx).n and moves the cursor to that position. If the current word position is in the overflow text, the cursor jumps (47) to the next time code TCx+1.

Assume now that the current position of the code in the text controls the video frame to be displayed.

The computer calculates (45) from the time code (41) TCx of the current section, the word count W to the current position in the section 43 and the reading rate n(44), the time code TCw of the current position, TCw=TCx+W/n.

That is also the time code of the corresponding video frame. As indicated at step 46, the computer accesses the corresponding video frame.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An editing system for editing a video sequence to generate a news story, the editing system comprising:
   display means for displaying a video clip including a plurality of consecutive pictures in a video display section and for displaying a proposed script associated with said video clip in a text display section;
   editing means for editing said proposed script displayed in said text display section to generate an edited script for defining an audio portion to accompany said video clip including a changed script so that a time duration for reading said edited script, and therefore a time duration of said audio portion matches a time duration of said video clip;
   means for displaying said edited script in place of said proposed script in said text display section;
   means for calculating a time code for each word of said edited script in accordance with a beginning time code and an end time code of said video clip;
   indicator means for indicating a current word position of said edited script in said text display section; and
   controlling means for controlling a position of said indicator means based upon said calculated time code for each word of said edited script in order to simulate correspondence between said video clip and said edited script.

2. A system according to claim 1, wherein the display means displays the video sequence and the text sequence side by side.

3. A system according to claim 2, wherein the displaying means comprises a single display screen and the video sequence and the text sequence are displayed in adjacent windows on the screen.

4. A system according to claim 1, wherein the time code associated with the current text position is calculated from a first time code component TCx which denotes the start of a section of text and a second time code component W/n where n is a preset rate of reading of words and W is the number of words of text from the start of the section to the current position.

5. A system according to claim 4, wherein the said time code component TCx denoting the start of a section of text is identical to the time code of the video frame corresponding to the start of the said section of text.

6. A system according to claim 4, wherein when the display of a video frame is controlled in dependence on the current text position, the controlling means selects from the video store the frame having the time code equal to or nearest to the time code associated with the current text position.

7. A system according to claim 4, wherein when the display of the current text position is controlled in dependence on the currently displayed video frame, the controlled means selects from the text store the section of text having a start time code TCx less than the time code VCy of the current frame and calculates the current text position according to $$VCy=TCx+W/n.$$

8. A system according to claim 4, wherein a section of text associated with a corresponding section of the video sequence is divisible into: an initial active, sub-section containing a number of words Wx where $Wx=(TCx+1-TCx).n$ where n is the preset rate of reading or words, TCx is the time code denoting the start of the section, and TCx+1 is the time code denoting the start of the next section; and a succeeding inactive sub-section; and the said controlling means disregards text in the inactive subsection.

* * * * *